United States Patent

Smith et al.

[11] Patent Number: 5,787,235
[45] Date of Patent: Jul. 28, 1998

[54] FUZZY LOGIC-BASED EVIDENCE FUSION TOOL FOR NETWORK ANALYSIS

[75] Inventors: Michael D. Smith, Burtonsville, Md.; Allen R. Bonde, Jr., Medfield, Mass.; Gregory J. Catherine, Germantown, Md.; Rosemarie Napolitano, Elkridge, Md.; Diane M. Wolfe, Germantown, Md.

[73] Assignee: GTE Government Systems Corporation, Needham, Mass.

[21] Appl. No.: 437,732

[22] Filed: May 9, 1995

[51] Int. Cl.$^6$ .................................................. G06F 17/00
[52] U.S. Cl. .................................. 395/50; 395/3; 395/61; 395/900; 395/54
[58] Field of Search ........................... 395/50, 61, 900, 395/3, 54

[56] References Cited

U.S. PATENT DOCUMENTS 5,485,550  1/1996  Dalton .......................... 395/51

OTHER PUBLICATIONS

Togai, Masaki and Watanabe, Hiroyuki, "Expert System on a Chip: An Engine for Real-Time Approximate Reasoning" IEEE Expert, vol. 1, No. 3, pp. 55-62, 1986.

Kandel, Abraham et al. "Fuzzy Intelligent Hybrid System Application to Routing Control in Telecommunication Networks" Uncertainty Modeling and Analysis, 1993 Int'l Symposium, pp. 281-284, Apr. 1993.

*Primary Examiner*—Robert W. Downs
*Assistant Examiner*—Jason W. Rhodes
*Attorney, Agent, or Firm*—Leonard C. Suchyta

[57] ABSTRACT

A fuzzy-logic-based evidence fusion tool for predicting function levels of a switch in a telecommunications network. Confidence factors related to the geographical location and to the physical characteristics of the switch are acquired and mapped into fuzzy membership values. The membership values activate a set of fuzzy evidence fusion rules at each function level, and a degree of truth for each rule is inferred. A defuzzification scheme combines the degree of truth of each rule into a single combined confidence factor for each function level. Finally, the maximum combined confidence factor for each rule is determined, and the switch function level corresponding to that confidence factor is assigned to the switch.

4 Claims, 5 Drawing Sheets

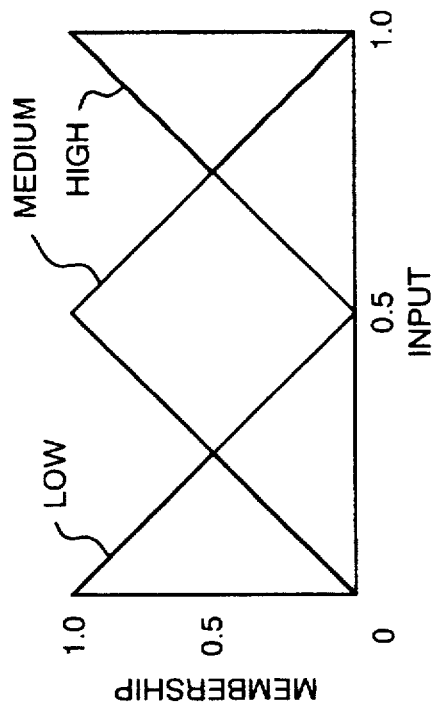

FIG. 2

(1) if CFgeo = LOW      and CFphys = LOW      then CFcombined = LOW
(2) if CFgeo = LOW      and CFphys = MEDIUM   then CFcombined = LOW
(3) if CFgeo = LOW      and CFphys = HIGH     then CFcombined = LOW
(4) if CFgeo = MEDIUM   and CFphys = LOW      then CFcombined = LOW
(5) if CFgeo = MEDIUM   and CFphys = MEDIUM   then CFcombined = MEDIUM
(6) if CFgeo = MEDIUM   and CFphys = HIGH     then CFcombined = HIGH
(7) if CFgeo = HIGH     and CFphys = LOW      then CFcombined = LOW
(8) if CFgeo = HIGH     and CFphys = MEDIUM   then CFcombined = HIGH
(9) if CFgeo = HIGH     and CFphys = HIGH     then CFcombined = HIGH

FIG. 3

Sample Input:  CFgeo  = (0.85/1, 0.15/2, 0.0/3)
            CFphys = (0.90/1, 0.10/1, 0.0/3)

Switch function 1:

Fuzzy mapping: CFgeo  0.85 -> $m_{low} = 0$  $m_{med} = 0.3$  $m_{high} = 0.7$
            CFphys 0.90 -> $m_{low} = 0$  $m_{med} = 0.2$  $m_{high} = 0.8$ Inference:
rule 5: min ($m_{med}$, $m_{med}$) = 0.2 MEDIUM
rule 6: min ($m_{med}$, $m_{high}$) = 0.3 HIGH
rule 8: min ($m_{high}$, $m_{med}$) = 0.2 HIGH
rule 9: min ($m_{high}$, $m_{high}$) = 0.7 HIGH
all other rules have zero activation ($m_{low} = 0$)

defuzzification: ( (0.2*0.5) + ( (0.3+0.2+0.7)*1.0) ) / (0.2+0.3+0.2+0.7)
                CFcombined (1) = 0.93

Switch function 2:

Fuzzy mapping: CFgeo  0.15 -> $m_{low} = 0.7$  $m_{med} = 0.3$  $m_{high} = 0.0$
            CFphys 0.10 -> $m_{low} = 0.8$  $m_{med} = 0.2$  $m_{high} = 0.0$ Inference:
rule 1: min ($m_{low}$, $m_{low}$)  = 0.7 LOW
rule 2: min ($m_{low}$, $m_{med}$)  = 0.2 LOW
rule 4: min ($m_{med}$, $m_{low}$)  = 0.3 LOW
rule 5: min ($m_{med}$, $m_{med}$)  = 0.2 MEDIUM
all other rules have zero activation ($m_{high} = 0$)

defuzzification: ( ( (0.7+0.2+0.3)*0.0) + (0.2*0.5) ) / (0.7+0.2+0.3+0.2)
                CFcombined (2) = 0.07

Switch function 3:

Fuzzy mapping: CFgeo  0.0 -> $m_{low} = 1.0$  $m_{med} = 0.0$  $m_{high} = 0.0$
            CFphys 0.0 -> $m_{low} = 1.0$  $m_{med} = 0.0$  $m_{high} = 0.0$ Inference:
rule 1: min ($m_{low}$, $m_{low}$)  = 1.0 LOW
all other rules have zero activation ($m_{med} = 0$; $m_{high} = 0$)

defuzzification: (1.0*0.0)/1.0
                CFcombined (3) = 0.00

Overall assessment: max ($CF_1$, $CF_2$, $CF_3$) = CFcombined(1)
                -> Switch Level 1, CF = 0.93

FIG. 5

| Data Set | CFgeo | CFphys | Expected Result (from expert) |
|---|---|---|---|
| DATA SET 1 | (0.85, 0.15, 0) | (0.9, 0.1, 0) | LEVEL 1, VERY HIGH CF |
| DATA SET 2 | (0.8, 0.2, 0) | (0.7, 0.4, 0) | LEVEL 1, HIGH CF |
| DATA SET 3 | (0.6, 0.4, 0) | (0.3, 0.7, 0.1) | LEVEL 2, MEDIUM CF |
| DATA SET 4 | (0, 0.3, 0.7) | (0.7, 0.4, 0) | LEVEL 2, LOW CF |
| DATA SET 5 | (0.85, 0.15, 0) | (0.1, 0.3, 0.7) | LEVEL 1, VERY LOW CF |

FIGURE 6

| | DATA SET 1 | DATA SET 2 | DATA SET 3 | DATA SET 4 | DATA SET 5 |
|---|---|---|---|---|---|
| MAX | L1 - 0.9 | L1 - 0.8 | L2 - 0.7 | UNDEFINED | L1 - 0.85 |
| MIN | L1 - 0.85 | L1 - 0.7 | L2 - 0.4 | L2 - 0.3 | L2 - 0.15 |
| PRODUCT | L1 - 0.76 | L1 - 0.56 | L2 - 0.28 | L2 - 0.12 | L1 - 0.08 |
| AVERAGE | L1 - 0.88 | L1 - 0.75 | L2 - 0.55 | UNDEFINED | L1 - 0.48 |
| UNION | L1 - 0.98 | L1 - 0.94 | L2 - 0.82 | UNDEFINED | L1 - 0.86 |
| EFT-1 | L1 - 0.93 | L1 - 0.89 | L2 - 0.5 | L2 - 0.21 | L1 - 0.21 |
| EFT-2 | L1 - 0.93 | L1 - 0.89 | L2 - 0.57 | L2 - 0.31 | L1 - 0.30 |

FIGURE 7

FUZZY LOGIC-BASED EVIDENCE FUSION TOOL FOR NETWORK ANALYSIS

BACKGROUND OF THE INVENTION

This invention pertains to apparatus for analysis of telephone systems and more particularly is concerned with a general purpose computer programmed to do such analysis. To make predictions about the most likely design of a country's telephone network, a telecommunication database, knowledge-based expert system, and the novel Evidence Fusion Tool described in this disclosure, to make predictions about the most likely design of a country's telephone network. The Evidence Fusion tool assists in the evaluation of what functional level a switch occupies in the network, and produces a measure of confidence associated with its prediction.

The human telecommunications expert examines data pertaining to the geographical position of a switch within a network, and based on the data makes a prediction about what function the switch performs within the network. Parallel to this, the telecommunications expert examines data pertaining to the physical characteristics of the switch and makes an independent determination of the function of the switch within the network. The telecommunications expert combines these two predictions, using prior experience, to reach a unified conclusion about the function of the switch. Since these two pieces of data are independent, knowing information about one "sensor" does not provide useful information about the other "sensor". In addition, the telecommunications expert may characterize sensor data with numerical confidence factors, and must account for the uncertainty of the analysis data. As such, it is impractical to use transitional knowledge-based system rules to automate this evidence fusion process.

When performing this analysis manually, telecommunications experts make their predictions by using information about the degree to which the two sensors agree, the quality of the data from the sensors, and the relative importance of each sensor to the analysis.

To automate this process, the following design criteria should be met:

A. The input from two sensors should be combined to produce a unified measure of truth (confidence) that approximates the answers a telecommunications expert would give if presented with the same data.

B. Device should arrive at an answer quickly, which for our purposes corresponds to a matter of seconds.

C. The combination operation needs to be performed in parallel for each of the possible output hypotheses. For our application, there are three hypotheses corresponding to the potential switch functions: first level switch, second level switch, third level switch.

D. Confidence factor relationships should be used to make the final decision about the switch function. The system should be able to arrive at a final decision by using a priori data about the number of switches that perform each output function, and E. The implementation needs to quantify the expert's knowledge in a form that approximates the natural language solution. Quantifying the expert's analysis in this manner will make it easy to adapt the device to changing environments and applications.

An apparatus to automate the process is called a Network Infrastructure Analysis device (NIAD).

There are four existing methods of data fusion: parametric templates, manual analysis, statistical methods, and algebraic computation. The analysis below first explains the operation of each of these data fusion methods, and then discusses the weakness of each method when applied to our problem domain. Each of these methods is found inadequate and therefore a new data fusion technique is desired.

Parametric templates use thresholds to establish the identity of an observed object. If the sensor values fall within a predefined identity range, that identity is assigned to the object. For our application, this method could be used by having the telecommunications experts establish geographic and physical data parameters for each possible output hypothesis.

While parametric templates are easy to implement and adapt to changing conditions, they present a number of disadvantages for our problem domain. First, in the presence of conflicting sensor data, there is no guarantee that the system will ever reach a conclusion. If the sensors conflict, it is highly possible that their values will never fall into one of the predefined template ranges. Second, because the boundaries between conclusions are defined using thresholds, the system output is brittle (i.e., a slight change in one of the input sensors would lead to a large change in the system output). Lastly, there is no easy way for the parametric template method to produce a measure of confidence with its analysis.

Manual analysis requires that the telecommunications experts manually combine the sensor inputs in response to each possible data condition. The expert's decisions could then be stored in a lookup table allowing the system to have a predefined output in response to any potential input.

This method has the advantage that it most nearly approximates the telecommunications expert's true analysis. However, for several reasons it is unacceptable for our problem. First, because each possible input case must be considered, the design process is time consuming. Also, the results of the analysis cannot be extrapolated to changing conditions. If the analysis conditions change, the design process must start over again from scratch. Lastly, even if the experts were to produce a confidence measure with their analysis, it would not be continuously defined over the input domain.

There are a number of statistical methods for combining data obtained from several sensors. The most common techniques are Classical Inferencing, Bayesian Inferencing, and Dempster-Shafer methods. These techniques rely on a well-defined problem domain and a a priori knowledge about the conditional probabilities associated with the input sensors. Since the problem domain is not well defined and is subject to change, one cannot reliably determine the necessary probability relationships to implement these methods.

There are various algebraic operations that have been proposed for combining two numerical sensor inputs. The operators evaluated are shown with the two sensor inputs represented by 'x' and 'y'. To test these combination methods, five sets of sensor data were used that cover a wide range of possible input values. The 'correct' output for each data set is the answer that a telecommunications expert gives when presented with the same data. The measure of performance for the algebraic operators is determined by how accurately each reproduces the expert's analysis for each data set.

The first vector, labeled CFgeo, corresponds to the geographic sensor's confidence that the switch performs a particular function. For example in DATA SET 1, based on the geographic data available. NIAD's knowledge-based system has a confidence of 0.85 that the switch is a level 1 switch, a confidence of 0.15 that the switch is a level 2 switch, and a 0 confidence that the switch is a level 3 switch. FIG. 6 shows the physical data, labeled CFphy and the answer and confidence factor (denoted CF) that a telecommunications expert gives when presented with the same data.

FIG. 7 compares the output of several algebraic operators with the output of the Evidence Fusion Tool as implemented in NIAD (denoted EFT-1), and the Evidence Fusion Tool using a slightly modified set of fuzzy rules (denoted EFT-2). The chart lists the conclusion reached about the function of the switch (L1 corresponds to level 1, and so on) and the final confidence. For each algebraic method, the operator was first applied "pairwise" at each level, and then the level with largest combined confidence factor was recorded. Errors, shown in bold, occur when the output does not agree with the expected results or when the algebraic operator produced conflicting results. When conflicting results were produced, UNDEFINED is listed as the output. For example, when the MAX operator is applied to DATA SET 4, the confidence factor output for both level 1 and level 3 is 0.7. There is no conclusive way to resolve these results, hence the UNDEFINED status.

The preceding analysis shows that each of the four traditional methods for data fusion are inadequate for computer telephone network analysis. This provides the impetus to develop a new data fusion method that more closely corresponds to the stated design criteria. In response to this need, we use fuzzy logic. Fuzzy Logic is based on Zadeh's fuzzy set theory which provides a robust mathematical framework for dealing with "real-world" imprecision and nonstatistical uncertainty. Typically, fuzzy logic is implemented as part of a fuzzy rule-based system, which often incorporates membership functions, a number of "linguistic" system variables, a rule base, an inferencing mechanism, and a defuzzification scheme.

Fuzzy rule-based systems have proven effective in a number of application areas such as intelligent control and decision support, especially where a system is difficult to characterize and has strict implementation constraints. In the field of telecommunications, fuzzy models have been applied and/or proposed for modeling uncertainty in broadband traffic automated VHF frequency management.

The process of combining multiple assertions into a single, combined assertion (represented by a truth statement & confidence factor) can be considered a special case of "data fusion." At the core of every data fusion scheme is an inference mechanism that transforms the assessment of two (or more) different knowledge sources or sensors into a unique assessment which not only reflects information generated by each sensor, but also knowledge which cannot be inferred by either sensor alone.

In general, the use of fuzzy logic for this type of evidence combination is one example of a class of inference mechanisms termed "fuzzy evidential reasoning". The application of fuzzy decision-making offers a robust framework for modeling uncertainty, and for capturing heuristic rules. In the Evidence Fusion Tool, these features are uniquely utilized to represent switch analysis data, combine confidence factors, and automate an expert's judgment. Other methods for inferring knowledge from multiple sources are Bayesian techniques, which use past knowledge about the occurrence of events to infer the occurrence of future events, Belief theory, which applies Dempster-Schafer methods and a broad class of approaches known as analytical geometric techniques.

The use of fuzzy logic for telecommunication network analysis and modeling (or configuration), as described hereinafter appears to be unique. However, various forms of fuzzy evidential reasoning have been applied in other application domains. For example, an approach based on fuzzy set theory has been developed for contingency ranking of the Taiwan power system. Post contingent quantities are expressed as fuzzy sets, and heuristic rules employed by system operators in contingency ranking are coded in the form of fuzzy reasoning rules. These rules form the basis for combining the evidence from each quantity and reaching an overall system severity index. It is reported that through proper tuning of the fuzzy parameters, the proposed approach can mimic experienced operators' performance in conducting contingency assessments.

Other related fuzzy-based information fusion applications include medical image understanding and computer vision.

SUMMARY OF THE INVENTION

There has been described an apparatus for determining which function level that a switch is likely functioning at in a telecommunication system wherein the switch can be functioning at any one function level in a set of n function levels, the switch having geographic characteristic and physical characteristics, the apparatus.

A database includes a first set of n confidence factors for switch, each confidence factor, CFgeo, representing the confidence that said switch is functioning at a corresponding function level based upon the geographic characteristics of said switch and a second set of n confidence factors for said switch, each confidence factor, CFphy, representing the confidence that said switch is functioning at a corresponding level based upon the physical characteristics of said switch.

A programmable general purpose computer is arranged to access database; Software programs said computer to: a) fuzzy map the confidence factor CFgeo for said switch into high, medium, and low fuzzy membership values for CFgeo at each function level; b) fuzzy map the confidence factor CFphy for said switch into high, medium, and low fuzzy membership values for CFphy at each function level; c) apply a set of fuzzy evidence fusion rules, each rule activated by the fuzzy membership values for CFgeo and CFphy at each function level; d) infer a degree of truth for each rule for each function level; e) combine the degree of truth of each rule into a single combined confidence fact CF for each function level; and f) determine the maximum combined confidence factor and assigning to the switch the function level corresponding to said maximum confidence factor.

BRIEF DESCRIPTION OF THE DRAWINGS

FIG. 2 is a map of fuzzy set membership functions;

FIG. 3 is a representative fuzzy evidence fusing rule set;

FIG. 5 is an example of fuzzy inference procedure.

FIG. 6 is a table description of test input data sets and outputs (predictions) that might be made by a human telecommunications expert.

FIG. 7 is a table comparison of several algebraic operators with the evidence fusion tool.

DETAILED DESCRIPTION OF THE INVENTION

Figure 1:
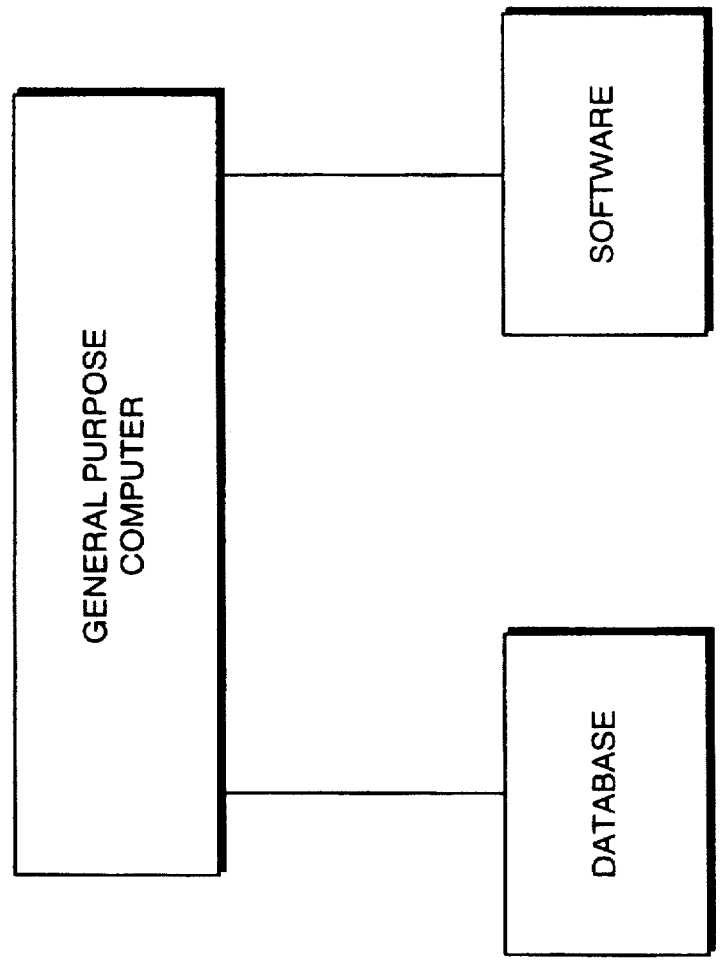
FIG. 1 illustrates an embodiment of the inventions.

FIG. 1 shows a general purpose computer programmed to function as the Evidence Fusion Tool of the invention.

The Evidence Fusion Tool takes two evaluations of truth from independent sources and combines them intelligently into one unified measure of truth. It can be applied in knowledge-based systems where several independent evaluations of an object are obtained, and when it is impractical to combine these evaluations using traditional knowledge-based system rules or other fusion techniques.

The Evidence Fusion Tool evaluates the function of a switch within a long distance network based on two independent sources of truth. The independent sources of truth are: the evaluation of data pertaining to the geographical characteristics of the switch, and the physical characteristics of the switch. Specifically, NIAD's knowledge-based system examines the geographical characteristics of a switch and assigns a number between 0 and 1 to represent the likelihood that the switch performs a particular function within a network. NIAD's knowledge-based system performs the same numerical evaluation separately for the physical characteristics of the switch. We will refer to these numbers as the confidence factor pertaining to the geographical data (CFgeo) or physical data (CFphy$_s$).

The problem is to combine two CF measures while taking into account the reliability of each set of data, applicability of the data to the specific situation being examined, and the degree to which the data is in agreement with the hypothesis. The Evidence Fusion Tool solves this problem by using fuzzy heuristic rules in a way that emulates a human expert's judgment and decision-making process.

To combine the CF measures, the Evidence Fusion Tool first maps each CF into the fuzzy sets: high confidence, medium confidence, and low confidence as shown in FIG. 2. The resulting fuzzy membership values, represented by $\mu_{low}$, $\mu_{med}$, and $\mu_{high}$ are then applied to nine fuzzy inferencing rules (as shown in FIG. 3), using the MIN function to combine the "activation" of each premise and determine the degree of truth for the conclusion of each rule. The overall output value is determined by combining the activation of each rule output variable using a singleton defuzzification method (weighted average). The result is a number between zero and one that represents the likelihood that the switch performs a specific hierarchical function based on both the physical and geographical data.

Figure 4:
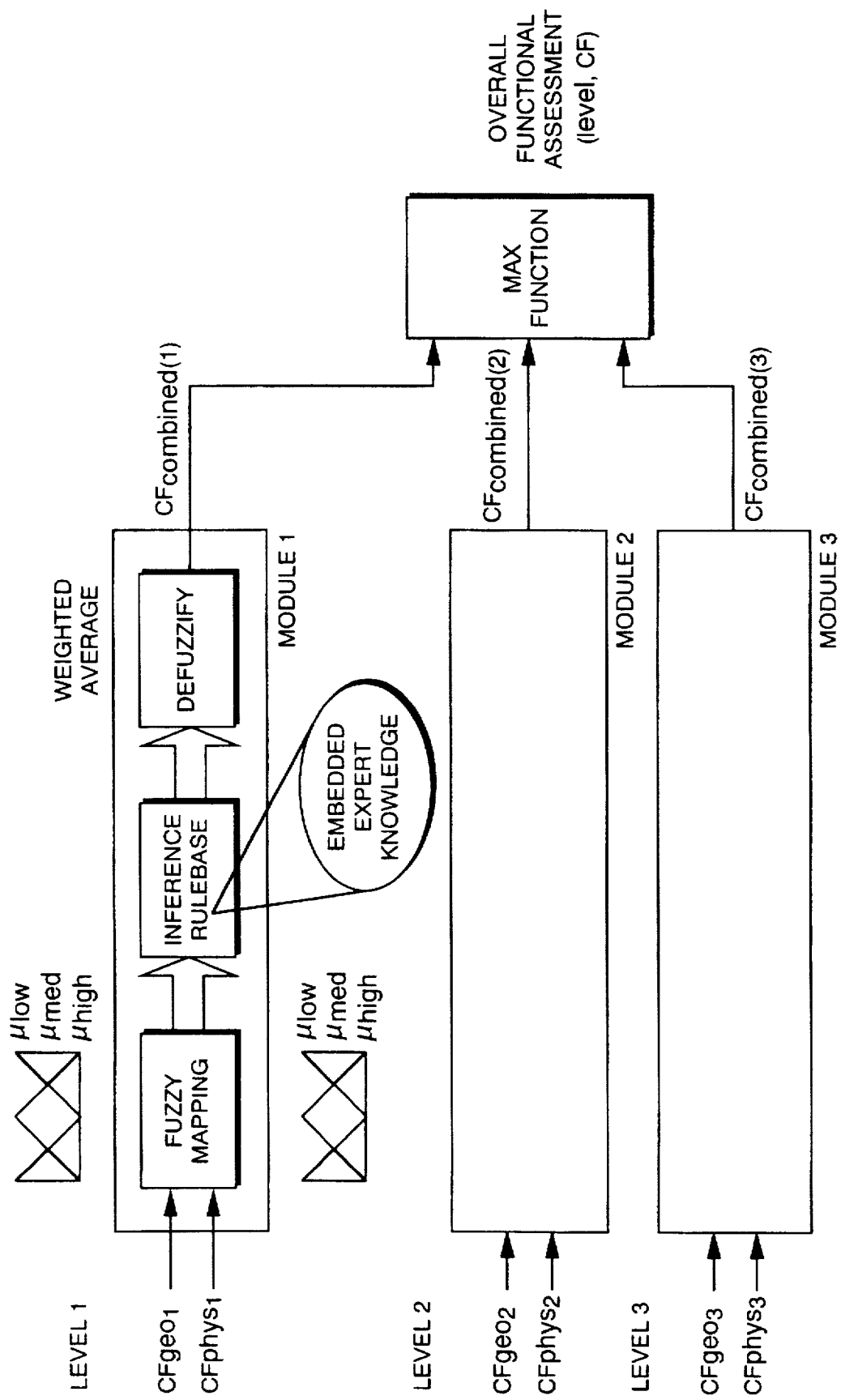
FIG. 4 illustrates parallel Evidence Fusion Tool architecture.

The application of the Evidence Fusion Tool is made more complex because three switch functions must be evaluated in parallel, but the general idea is still the same. the difference in this case is that the Evidence Fusion Tool will return three values corresponding to the combined CF for each of the three possible switch functions. The parallel Evidence Fusion Tool architecture in this case is shown in FIG. 4. Note that modules 2 and 3 contain the same components shown in module 1. A simple example of the complete inference procedure is given in FIG. 5. As shown, if no data is provided about the number of switches at each functional level, the assigned switch function will be the output with the largest CF. A more complex analysis process can be employed if the number of switches satisfying each output hypothesis is known by the system.

NIAD has been tested on the long distance networks X and Y with good results. In the case of network Y, NIAD's conclusions were in agreement with the known design of the network 92% of the time. In the case of network X, NIAD's conclusions were in agreement with the GTE telecommunications expert's evaluation of the network 75% of the time. For these types of applications, where conclusions are based on uncertain or imprecise data, accuracy of 70% is considered good and accuracy of 85% is considered very good. The performance of the Evidence Fusion Tool is a critical part of these positive results.

The Evidence Fusion Tool which, based on our empirical data, has the following useful characteristics when applied to telephone network analysis.

For a sample set of input data, its output most closely reproduces the answers given by telecommunications experts when presented with the same data (see FIG. 3 above).

The fuzzy rules are closely related to the natural language used by telecommunications experts to explain their decision making process, and therefore are easily understood by users and designers of the system.

Since the fuzzy logic structure uses a modular design of fuzzy sets, fuzzy rules, and defuzzification weights, it is easy to maintain and can be adapted to changing circumstances and applications.

The design is computationally efficient both in implementation and execution.

Although the design uses numerical abstraction to achieve its results, it retains the flavor of the original data by using soft-decisions as opposed to hard thresholds.

Based on our empirical data and a comparison of the other possible methods of combining data, we believe that our design provides the most practical method for combining multiple sensor inputs to make functional switch type predictions. Additionally, we feel that the following aspects of the Evidence Fusion Tool are unique:

The application of fuzzy logic to telecommunication network configuration analysis, modeling, and assessment.

The mapping of observed switch function confidence factors into fuzzy sets to model sensor uncertainty.

The embedded expert-defined decision rules used for sensor combination and conflict management in determining the functional type of network components.

The use of a parallel inferencing architecture to evaluate multiple switch class hypotheses and output a single, overall functional assessment.

Because the international telecommunications field is changing rapidly, the Evidence Fusion Tool will is able to adapt to frequent changes. Since it uses a flexible design, the process of changing the output characteristics of the device is simple. The fuzzy rules can be changed or enhanced, additional sensors can be added to the analysis, new fuzzy set definitions can be established or existing fuzzy sets can be redefined, and the defuzzification method can be altered for new domains. This characteristic is critical to successful performance in the problem domain.

Based on the analysis, the usefulness of the Evidence Fusion Tool may extend to domains other than network modeling. It will be useful in any decision domain where multiple, independent sensors are observed and need to be combined to determine the identity of the observed object and to produce a numerical measure of confidence. It will be most useful when the analysis can be accomplished by human experts, and when those experts are available to assist in the fuzzy set definition and the fuzzy rule production. Various modifications will be apparent to those skilled in the art. Accordingly the scope of the invention is determined by the following claims:

What is claimed is:

1. Apparatus for determining which function level that a switch is likely functioning at in a telecommunication system wherein said switch can be functioning at any one in a set of n function levels, said switch having geographic characteristics and physical characteristics, said apparatus comprising:

an expert system for providing a first set of n confidence factors for the switch, each confidence factor, CFgeo, representing the confidence that the switch is functioning at a corresponding function level based upon the geographic characteristics of the switch and for providing a second set of n confidence factors for the switch, each confidence factor, CFphy, representing the confidence that the switch is functioning at a corresponding level based upon the physical characteristics of the switch;

fuzzy mapping means for fuzzy mapping the confidence factor CFgeo for the switch into high, medium and low fuzzy membership values for CFgeo at each function level;

fuzzy mapping means for fuzzy mapping the confidence factor CFphy for the switch into high, medium and low fuzzy membership values for CFphy at each function level;

a set of fuzzy evidence fusion rules coupled to the fuzzy mapping means, each rule activated by the fuzzy membership values for CFgeo and CFphy at each function level for inferring a degree of truth for each rule for each function level;

a singleton defuzzification means for combining the degree of truth of each rule into a single combined confidence factor CF for each function level; and means for determining the maximum combined confidence factor and assigning to the switch the function level corresponding to the maximum confidence factor.

2. Apparatus for determining which function level that a switch is likely functioning at in a telecommunication system wherein the switch can be functioning at any one function level in a set of n function levels, the switch having geographic characteristics and a first set of n confidence factors for the switch, each confidence factor, CFgeo, representing the confidence that the switch is functioning at a corresponding function level based upon the geographic characteristics of the switch and physical characteristics, a second set of n confidence factors for the switch, each confidence factor, CFphy, representing the confidence that the switch is functioning at a corresponding level based upon the physical characteristics of the switch, the apparatus comprising:

fuzzy mapping means for fuzzy mapping the confidence factor CFgeo for the switch into high, medium and low fuzzy membership values for CFgeo at each function level;

fuzzy mapping means for fuzzy mapping the confidence factor CFphy for the switch into high, medium and low fuzzy membership values for CFphy at each function level;

a set of fuzzy evidence fusion rules coupled to the fuzzy mapping means, each rule activated by the fuzzy membership values for CFgeo and CFphy at each function level for inferring a degree of truth for each rule for each function level;

a singleton defuzzification means for combining the degree of truth of each rule into a single combined confidence factor CF for each function level; and means for determining the maximum combined confidence factor and assigning to the switch the function level corresponding to the maximum confidence factor.

3. A computer method for determining which function level that a switch is likely functioning at in a telecommunication system wherein the switch can be functioning at any one function level in a set of n function levels, the switch having geographic characteristics and physical characteristics, comprising the steps:

providing a first set of n confidence factors for the switch, each confidence level, CFgeo, representing the confidence that the switch is functioning at a corresponding function level based upon the geographic characteristics of the switch;

providing a second set of n confidence factors for the switch, each confidence level, CFphy, representing the confidence that the switch is functioning at a corresponding level based upon the physical characteristics of the switch;

fuzzy mapping the confidence factor CFgeo for the switch into high, medium and low fuzzy membership values for CFgeo at each function level;

fuzzy mapping the confidence factor CFphy for the switch into high, medium and low fuzzy membership values for CFphy at each function level;

providing a set of fuzzy evidence fusion rules, each rule activated by the fuzzy membership values for CFgeo and CFphy at each function level;

inferring a degree of truth for each rule for each function level;

combining the degree of truth of each rule into a single combined confidence factor CF for each function level; and determining the maximum combined confidence factor and assigning to the switch the function level corresponding to the maximum confidence factor.

4. Apparatus for determining which function level that a switch is likely functioning at in a telecommunication system wherein the switch can be functioning at any one function level in a set of n function levels, the switch having geographic characteristics and physical characteristics, comprising: a data base including a first set of n confidence factors for the switch, each confidence level, CFgeo, representing the confidence that the switch is functioning at a corresponding function level based upon the geographic characteristics of the switch and a second set of n confidence factors for the switch, each confidence level, CFphy, representing the confidence that the switch is functioning at a corresponding level based upon the physical characteristics of the switch; a programmable computer arranged to access the data base; and software adapted to program the computer to: a) fuzzy map the confidence factor CFgeo for the switch into high, medium and low fuzzy membership values for CFgeo at each function level; b) fuzzy map the confidence factor CFphy for the switch into high, medium and low fuzzy membership values for CFphy at each function level; c) apply a set of fuzzy evidence fusion rules, each rule activated by the fuzzy membership values for CFgeo and CFphy at each function level; d) infer a degree of truth for each rule for each function level; e) combine the degree of truth of each rule into a single combined confidence factor CF for each function level; and f) determine the maximum combined confidence factor and assign to the switch the function level corresponding to the maximum confidence factor.

* * * * *